Patented June 28, 1949

2,474,612

UNITED STATES PATENT OFFICE 2,474,612

COPOLYMERS OF VINYL ISO-COUMARANS WITH ETHYLENICALLY UNSATURATED COMPOUNDS AND PROCESS FOR OBTAINING SAME

Arthur L. Barney, Wilmington, Del., assignor to E. I. du Pont de Nemours & Company, Wilmington, Del., a corporation of Delaware No Drawing. Application September 19, 1946, Serial No. 697,900

7 Claims. (Cl. 260—80.3)

This invention relates to new and useful compositions of matter, and more particularly to polymeric materials.

This invention has as an object a class of polymeric materials comprising new copolymers which are characterized by high melting points, and which are of particular value in the coating, molding and textile arts. Further objects reside in methods for obtaining these copolymers. Other objects will appear hereinafter.

The above objects are accomplished by copolymerizing at moderate temperature and in contact with a polymerization catalyst a mixture of certain vinyl isocoumarans which are defined below, and particularly 1,3-alkyl-4-vinylisocoumarans, with an ethylenically unsaturated polymerizable organic compound of the general formula,

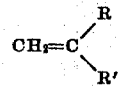

wherein R is hydrogen or a hydrocarbon radical, and R' is a non-ionic radical which exerts, when attached to a benzene nucleus, a positive electrostatic polarizing effect on the adjacent carbon to carbon double bond, of said benzene nucleus. These radicals, as have been classified by Price in Chem. Rev. 29, 58 (1941) in connection with data which shows their polarizing force as ranging from +0.32 to +2.21, are $CH_2CN$, $CH_2Cl$, $CH_2Br$, $CH_2F$, H, $C(CH_3)_2NO_2$, $CH_2NO_2$, $CHCl_2$, N=O, $CONH_2$, $COCH_3$, $CCl_3$, CHO, $CH(CN)_2$, $COOCH_3$, COOH, $SO_2CH_3$, $CF_3$, COCl, C≡N, $SO_3H$, $NO_2$.

The above mentioned vinyl isocoumarans have the formula

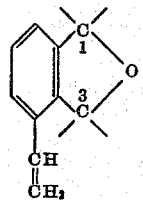

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

The present copolymers are obtained by reacting a mixture of polymerizable materials consisting wholly or preponderately of those defined above at normal or elevated temperatures in contact with a polymerization catalyst. The reaction is best carried out by contacting a mixture of the vinyl isocoumaran and the unsaturated compound with from 0.25 to 1.0% of a peroxygen compound such as ammonium persulfate, or in the case of comonomers which exist in the gaseous state at ordinary pressures, 0.25 to 1.0% of benzoyl peroxide, based on the total weight of the monomers employed, and a suitable medium such as water, or in conjunction with water insoluble catalysts such as benzoyl peroxide, an organic solvent such as benzene. When employing an aqueous system, it is advantageous to use any of a number of commonly used emulsifying agents, such as the sodium salts of higher alkyl sulfates, to aid in the proper dispersion of the monomers. In addition, it is preferred to employ 0.05 to 0.5% of an auxiliary catalyst such as sodium bisulfite in conjunction with water soluble catalyst such as ammonium persulfate.

The reaction medium, whether aqueous or non-aqueous, is not an essential constituent of the reaction mixture, but it is preferred to employ a reaction medium such as water to aid in the proper mixing and dispersing of the catalyst and monomers with one another. The polymerization can be carried out, however, in the absence of any medium or solvent. The reaction can be run in a closed system or additional monomer or monomers may be injected from time to time as desired. The following examples in which the parts given are by weight, illustrate ways in which the invention can be practiced.

EXAMPLE I

Ninety parts of methyl methacrylate, 10 parts of 1,1,3,3-tetramethyl-4-vinylisocoumaran and 0.1 part of benzoin is placed in a glass reaction vessel and the atmosphere above the reaction mixture displaced with nitrogen. Whereupon, the reaction flask is closed and the reaction mixture allowed to stand at room temperature exposed to diffused light for 11 days, and finally baked for three days at 75° C. There is obtained 100 parts of a clear, light colored plastic which when powdered and subjected to 2000 p. s. i. pressure and 190° C. for 2 minutes possesses a softening point of 105° C., Rockwell hardness value of 125, and an Izod impact strength of 0.466 pound/in. notch. A molded bar exhibits a tensile strength of 5116 p. s. i. and a flexural strength of 12050 p. s. i.

Example II

There is added to a suitable reaction vessel, 50 parts of acrylonitrile, 50 parts of 1,1,3,3-tetramethyl-4-vinyl-isocoumaran, 8.8 parts of a dispersing agent containing as the active ingredient 23% of the sodium salts of higher alkyl sulfates, 0.5 part of ammonium persulfate, 0.1 part of sodium bisulfite and 300 parts of copper-free distilled water, and the reaction mixture agitated for 16 hours at 60° C. The product, after cooling and opening the reaction vessel, is isolated by filtration, washed repeatedly with water and dried in vacuo for 60 hrs. The polymer so obtained contains on analysis 12.31% nitrogen. (Theoretical nitrogen content for a 50:50 copolymer is 13.2%).

Example III

There is placed in a suitable reaction vessel, 70 parts of methyl methacrylate, 30 parts of 1,1,3,3-tetramethyl-4-vinylisocoumaran, 12.4 parts of a dispersing agent containing as the active ingredient 32% of the sodium salts of higher alkyl sulfonates, 1.0 part of ammonium persulfate, 0.1 part of sodium bisulfite and 300 parts of copper-free distilled water, and the reaction mixture agitated for 16 hours at 60° C. The product, after cooling and opening the reaction vessel, is isolated by filtration, washed repeatedly with water and finally with methanol. After drying the product, there is obtained 94 parts of white powdered polymer possessing a relative viscosity of 1.259, (determined on a solution of 0.1 g. of polymer in 100 ml. of chloroform). The polymer thus prepared, and after subjecting to 1000 p. s. i. pressure and 225° C. for 2 minutes, possesses a softening point of 140° C., a Rockwell hardness value of 124, an Izod impact strength of 0.288 lb./in. notch, tensile strength of 4050 p. s. i. and a flexural strength of 7010 p. s. i.

Example IV

A stainless steel-lined pressure reactor is charged with 100 parts of benzene, 25 parts of 1,1,3,3-tetramethyl-4-vinylisocoumaran and 0.4 part of di-(tert.-butyl) peroxide and pressured to 850 atmospheres of ethylene. The reactor is then agitated and heated to 140° C., the pressure being maintained in the range of 850 to 1025 atmospheres by the injection of ethylene, for 45 minutes. Thereupon, the reactor is cooled and discharged. The polymer is isolated by removing the benzene by steam distillation and air dried at 70° C. Thus, there is obtained a polymer possessing a relative viscosity of 1.082 (as determined on a solution of 0.25 g. of polymer in 100 ml. of benzene). The polymer thus prepared possesses a softening point of 50° C. and a stiffness value of 52,000 p. s. i.

Example V

There is placed in a suitable reaction vessel, 90 parts of methyl methacrylate, 10 parts of 1,1,3,3-tetramethyl-4-vinylisocoumaran, 12.4 parts of the dispersing agent mentioned in Example III, 1.0 part of ammonium persulfate, 0.1 part of sodium bisulfite and 300 parts of copper-free distilled water, and the reaction mixture agitated for 16 hours at 60° C. The product, after cooling and opening the reaction vessel, is isolated by filtration, washed repeatedly with water and finally with methanol. After drying for 4 hours at 90° C., there is obtained 97 parts of white polymer possessing a relative viscosity of 1.238, (determined on a solution of 0.1 g. of polymer in 100 ml. of chloroform). A polymer thus prepared possesses a softening point of 123° C., a Rockwell hardness value of 120, an Izod impact strength of 0.265 lb./in. of notch, tensile strength of 7360 p. s. i. and a flexural strength of 12040 p. s. i.

Example VI

There is placed in a suitable reaction vessel, 90 parts of acrylonitrile, 10 parts of 1,1,3,3-tetramethyl-4-vinylisocoumaran, 17.4 parts of the dispersing agent mentioned in Example II, 1.0 part of ammonium persulfate, 0.1 part of sodium bisulfite and 300 parts of copper-free distilled water, and the reaction mixture agitated for 16 hours at 60° C. The product after cooling and opening the reaction vessel is isolated by filtration, washed repeatedly with water, and finally with methanol. After drying for 4 hours at 90° C., there is obtained 98 parts of a white polymer possessing a relative viscosity of 1.678, (as determined on a solution of 0.1 g. polymer in 100 ml. of dimethyl formamide). The polymer so obtained contains on analysis 23.97% nitrogen. (Theoretical nitrogen content for a 90/10 copolymer is 23.75%).

Example VII

There is placed in a suitable reaction vessel equipped with means for high speed stirring, 90 parts of methyl methacrylate, 10 parts of 1,1,3,3-tetramethyl-4-vinylisocoumaran, 2 parts of 2% aqueous polymethacrylic acid 65% neutralized with sodium hydroxide, 2 parts of di-sodium phosphate heptahydrate, 2 parts of benzoyl peroxide and 170 parts of copper-free distilled water, and the reaction mixture vigorously stirred for 1 hour at 90–95° C. The product after cooling and discharging the reaction vessel is isolated by filtration, washed repeatedly with water and finally with methanol. After drying for 16 hours at 85° C., there is obtained a white polymer possessing a relative viscosity of 1.088, (determined on a solution of 0.1 g. of polymer in 100 ml. of chloroform). The polymer so prepared, after subjecting to 1000 p. s. i. pressure at 170° C. for 1 minute, possesses a softening point of 110° C., an Izod impact strength of 0.187 lb./in. notch, tensile strength of 8520 p. s. i., flexural strength of 16,650 p. s. i. and a stiffness value of 149,360 p. s. i.

Example VIII

There is placed in a suitable reaction vessel, 80 parts of methyl acrylate, 20 parts of 1,1,3,3-tetramethyl-4-vinylisocoumaran, 12.4 parts of the dispersing agent mentioned in Example III, 1.0 part of ammonium persulfate, 0.1 part of sodium bisulfite and 300 parts of copper-free distilled water, and the reaction mixture agitated for 16 hours at 50° C. The product after cooling and opening the reaction vessel is coagulated with 20 parts of a 10% aqueous solution of aluminum sulfate, submitted to steam distillation to remove residual monomer, if any, isolated by filtration, and finally washed repeatedly with water. After drying the product, there is obtained 86 parts of white powdered polymer. The polymer thus prepared, and after subjecting to 500 p. s. i. pressure and 135° C. for one minute, possesses a softening point of 40° C.

Example IX

There is placed in a suitable reaction vessel, 80 parts of butyl methacrylate, 20 parts of 1,1,3,3- tetramethyl-4-vinylisocoumaran, 12.4 parts of the dispersing agent mentioned in Example III, 1.0 part of ammonium persulfate, 0.1 part of sodium bisulfite and 300 parts of copper-free distilled water, and the reaction mixture agitated for 16 hours at 50° C. The product after cooling and opening the reaction vessel is coagulated with 10 parts of a 10% aqueous solution of aluminum sulfate, submitted to steam distillation to remove residual monomer, if any, isolated by filtration, and finally washed repeatedly with water. After drying the product, there is obtained 97 parts of white powdered polymer. The polymer thus prepared, and after subjecting to 500 p. s. i. pressure and 125° C. for one minute, possesses a softening point of 61° C.

Examples of hydrocarbon substituents in the previously defined vinyl isocoumarans include methyl, ethyl, propyl, isobutyl, tertiary-butyl, isoamyl hexyl, dodecyl, tetramethylene, pentamethylene, phenyl, tolyl, and xylyl. Further examples of vinyl isocoumarans useful in the practice of this invention are 1,3-dimethyl-4-vinylisocoumaran, 1,3 - dimethyl-1,3-diethyl-4-vinylisocoumaran, 1,3-dimethyl-1,3-dipropyl-4-vinylisocoumaran, 1,3-dipentamethylene-4-vinylisocoumaran, [4'-vinyldispirio - (cyclohexane-1,1'-isocoumaran - 3'-1''-cyclohexane)], 1,3 - dimethyl-1,3-diphenyl-4-vinylisocoumaran, 1,3-dimethyl-1,3-di(p-tolyl)-4-vinylisocoumaran and the like.

The vinyl isocoumarans most advantageously used in the practice of this invention are those in which the hydrocarbon radicals in the 1,3-positions contain from 1 to 6 carbon atoms, preferably alkyl.

Suitable polymerizable materials within the previously defined general formula

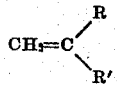

are ethylene and nitroethylene; acrylic acid derivatives such as acrylic acid, methacrylic acid, acrylonitrile, methacrylonitrile, methyl acrylate, methyl methacrylate, isobutyl acrylate, isobutyl methacrylate, tetraethylene glycol dimethacrylate, methyl alpha-ethyl acrylate, methyl alpha-isopropyl acrylate, lauryl acrylate, lauryl methacrylate, acrylamide, methacrylamide; vinyl ketones such as methylvinyl ketone and methyl isopropenyl ketone, and vinyl aldehydes such as acrolein and alpha-methyl acrolein.

The temperatures employed in carrying out the process of this invention lie in the range from about 25° C. to about 200° C., the actual temperature being employed depending on the polymerizable characteristics of the particular unsaturated compound which is to be polymerized. In general, however, the preferred range of temperature is 40 to 150° C., since within this range the majority of the compounds generally employed polymerize at a satisfactory rate and in such a fashion that the reaction is readily controllable.

The process of this invention can be carried out under pressures varying from atmospheric to 1000 atmospheres and higher, the upper pressure limit depending only on the apparatus available. The pressure required in any given instance will depend, in general, on the nature of the comonomer to be polymerized with the vinyl isocoumaran. For example, monomers which exist in the liquid state under ordinary pressures and temperatures such as methyl methacrylate, may be polymerized under autogenous pressures; whereas, with monomers which exist in the gaseous state under ordinary pressures and temperatures such as ethylene, it is preferred to employ pressure, sometimes, as high as 1000 atmospheres.

The use of water or inert organic solvents is not an essential feature of the invention; however, in most cases, the use of water or an inert organic solvent is quite desirable to aid in the proper mixing and dispersing of catalyst and monomers. Examples of inert organic solvents which may be employed, instead of or in addition to water, include hydrocarbons such as hexane, octane, isooctane, cyclohexane, methyl cyclohexanes, benzene, toluene and xylenes; alcohols such as tert.-butanol; ethers such as diethyl ether and dioxane, esters, such as ethyl acetate and ethyl benzoate, alkyl and aryl halides such as carbon tetrachloride, chloroform, ethylene dichloride, ethyl chloride and chlorobenzene, ketones such as acetone and cyclohexanone, nitriles such as acetonitrile and benzonitrile, and the like. It is preferred to employ a dispersing agent to aid in the proper mixing and dispersing of water insoluble monomers and catalyst in aqueous systems. Any of a number of dispersing agents commonly employed in the emulsion polymerization of vinyl compounds may be used, such as those containing as the active ingredients the sodium salts of higher alkyl sulfates such as sodium decyl, dodecyl and tetradecyl sulfates; the sodium salts of higher alkane sulfonates such as sodium decyl and dodecyl sulfonates; the monosodium salt of sulfated methyl oleate; the sodium salt of sulfonated oleyl acetate; sodium oleate and the like.

A wide variety of polymerization catalysts may be employed in the practice of this invention. Among the most useful of these catalysts are those compounds capable of initiating polymerization such as free radical generating materials represented by peroxygen and azo compounds, and inorganic acids and their metal salts. By peroxygen compounds, is meant a compound containing the peroxygen linkage, —O—O—; and by azo compounds, is meant a compound containing the azo linkage, —N=N—. Examples of compounds of this kind useful in the practice of this invention are peroxygen compounds such as di-acyl peroxide, including di-benzoyl peroxide, benzoyl acetyl peroxide, di-lauroyl peroxide, di-acetyl peroxide and di-propionyl peroxide, di-alkyl peroxides including di-ethyl peroxide, di-propyl peroxide and di-(tert.-butyl) peroxide, hydrogen peroxide, inorganic peroxides including barium peroxide, magnesium peroxide and zinc peroxide, and salts of non-metallic inorganic peroxygen acids including ammonium persulfate, potassium persulfate, sodium persulfate, potassium percarbonate, potassium perphosphate and sodium perborate, the salts of peroxygen acids being especially effective if used in conjunction with minor proportions of an auxiliary catalyst such as sodium bisulfite, sodium hydrosulfite, potassium ferricyanide, etc.; azo compounds such as alpha,alpha'-azobis(alpha,gamma-dimethylvaleronitrile), dimethyl and diethyl alpha,alpha'-azodiisobutyrate, 1,1'-azodicyclohexanecarbonitrile, alpha,alpha'-azobis(alpha-methylbutyronitrile), alpha,alpha'-azobis(alpha-ethylbutyronitrile) and alpha,alpha'-azobisdiisobutyrocarbonamide and dipotassium azosulfonate; and inorganic acids and their metal salts such as sulfuric acid, phosphoric acid, aluminum chloride, zinc chloride, stannic chloride, boron trichloride, boron trifluoride, and the like. The catalyst should be employed in an amount in excess of 0.001%, (based on the total weight of monomers), and preferably, there is employed between 0.1 and 1.0% of catalyst.

A very small amount of the vinyl isocoumaran relative to the ethylenically unsaturated compound yields products having properties and utility quite different from the polymer obtained by polymerizing either of these components alone. Thus the copolymer of Example V containing 10% of the vinyl isocoumaran and 90% of methyl methacrylate compares in certain important properties with the polymers of the separate components as follows:

Polymers of methyl methacrylate and 1,1,3,3-tetramethyl-4-vinylisocoumaran

| Ratio MMA to VIC | Softening Point (° C.) | Izod Impact Strength | Tensile Strength |
| --- | --- | --- | --- |
| 100/0 | 108 | 0.242 | 6,250 |
| 90/10 | 123 | 0.265 | 7,360 |
| 0/100 | >250 | | |

In the first column of the above table, the letters MMA refer to methyl methacrylate, and VIC to 1,1,3,3,-tetramethyl-4-vinylisocoumaran. The impact and tensile strengths in the third and fourth columns are given in pounds per square inch. In these columns the dashes indicate that the sample was too brittle for measuring the strength. Methyl methacrylate copolymers prepared in accordance with the present invention soften at least 5° C. higher than polymethyl methacrylate itself. The most useful copolymers are those containing on the basis of the weight of the copolymer from 1 part of the vinyl isocoumaran and 99 parts of the ethylenically unsaturated compound to 50 parts of the vinyl isocoumaran and 50 parts of the ethylenically unsaturated compound. However, copolymers which differ appreciably from the separately polymerized components are obtained within the range of from 1 part of the vinyl isocoumaran and 99 parts of the ethylenically unsaturated compound to 90 parts of the vinyl isocoumaran and 10 parts of the ethylenically unsaturated compound.

The vinyl isocoumarans used in the practice of the present invention are best prepared by the self-condensation of the corresponding (vinylethinyl) carbinol according to the method described in Chemical Abstracts 37, 2343 (1943), and Chemical Abstracts 39, 1619 (1945). For example, 1,1,3,3,-tetramethyl-4-vinylisocoumaran can be readily prepared by the self condensation of dimethyl (vinylethinyl) carbinol $$CH_2=CH-C\equiv C-C(CH_3)_2OH$$

which in turn can be obtained from monovinylacetylene and acetone. In this condensation two molecules of the carbinol yield one molecule of water and one molecule of vinyl isocoumaran having the structural formula previously given wherein all of the R substituents are methyl groups.

The copolymers described herein are useful in the manufacture of a large number of improved products in the molding, textile and film-forming fields. For example, they can be molded under elevated temperatures and pressures into films, foils, tapes, and massive articles, characterized by high softening properties. These polymers can be spun into valuable fibers by melt or solution extrusion techniques, and these can be oriented by drawing and can be knitted or woven into a variety of useful fabrics. By solvent casting techniques, films valuable as wrapping foils, etc. may be prepared. These copolymers in suitable form such as films can be employed as dielectrics for condenser construction, spacers for storage batteries and the like.

Of particular utility are copolymers of methyl methacrylate and 1,1,3,3-tetramethyl-4-vinylisocoumaran containing about 5–20% of the latter component. Such compositions may be fabricated into articles, by compression or injection molding techniques, which are essentially completely resistant to the action of boiling water and thus may be used in the preparation of articles which must withstand sterilization, such as surgical instruments and the like.

As many apparently widely different embodiments of this inevntion may be made without departing from the spirit and scope thereof, it is to be understood that I do not limit myself to the specific embodiments thereof except as defined in the appended claims.

I claim:

1. A copolymer comprising the copolymerization product of a vinyl isocoumaran and an ethylenically unsaturated polymerizable organic compound of the formula

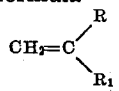

in which R is selected from the group consisting of hydrogen and hydrocarbon radicals, and R₁ is a non-ionic radical which exerts, when attached to a benzene nucleus, a positive electrostatic polarizing force of from +0.32 to +2.21 on the adjacent carbon to carbon double bond, said copolymer containing, by weight of said vinyl isocoumaran and ethylenically unsaturated compound, from 1% to 50% of said vinyl isocoumaran, said vinyl isocoumaran being of the formula

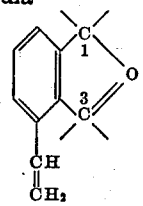

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms by a divalent polymethylene radical having a chain of four to five carbon atoms to form a polymethylene ring of five to six carbon atoms.

2. The copolymer defined in claim 1 in which one valence of each carbon atom in positions 1 and 3 in said vinyl isocoumaran is satisfied by an alkyl radical containing from 1 to 6 carbon atoms.

3. The copolymer defined in claim 1 in which all the valences of each carbon atom in positions 1 and 3 in said vinyl isocoumaran are satisfied by $CH_3$.

4. The copolymer set forth in claim 1 in which all the valences of each carbon atom in positions 1 and 3 in the said vinyl isocoumaran are satisfied by methyl groups, and in which the ethylenically unsaturated polymerizable compound is methyl methacrylate, said copolymer softening at least 5° C. higher than polymethyl methacrylate.

5. A process for obtaining copolymers which comprises reacting, in the presence of a polymerization catalyst at a temperature of from 25° C. to 200° C. and under a pressure of at least atmospheric, a vinyl isocoumaran and an ethylenically unsaturated polymerizable organic compound of the formula

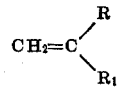

in which R is selected from the group consisting of hydrogen and hydrocarbon radicals, and $R_1$ is a non-ionic radical which exerts, when attached to a benzene nucleus, a positive electrostatic polarizing force of from $+0.32$ to $+2.21$ on the adjacent carbon to carbon double bond, said vinyl isocoumaran being present in amount of 1% to 50% by weight of said ethylenically unsaturated compound and said vinyl isocoumaran, said vinyl isocoumaran being of the formula

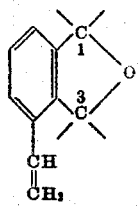

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

6. The process set forth in claim 5 in which one valence of each carbon atom in positions 1 and 3 in said vinyl isocoumaran is satisfied by an alkyl radical containing from 1 to 6 carbon atoms.

7. The process set forth in claim 5 in which all the valences of each carbon atom in positions 1 and 3 in said vinyl isocoumaran are satisfied by $CH_3$.

ARTHUR L. BARNEY.

REFERENCES CITED

The following references are of record in the file of this patent:

UNITED STATES PATENTS

| Number | Name | Date |
|---|---|---|
| 2,358,444 | Coffman et al. | Sept. 19, 1944 |